A. E. CINQ-MARS.
DEMOUNTABLE RIM.
APPLICATION FILED SEPT. 30, 1916.
1,255,708. Patented Feb. 5, 1918.
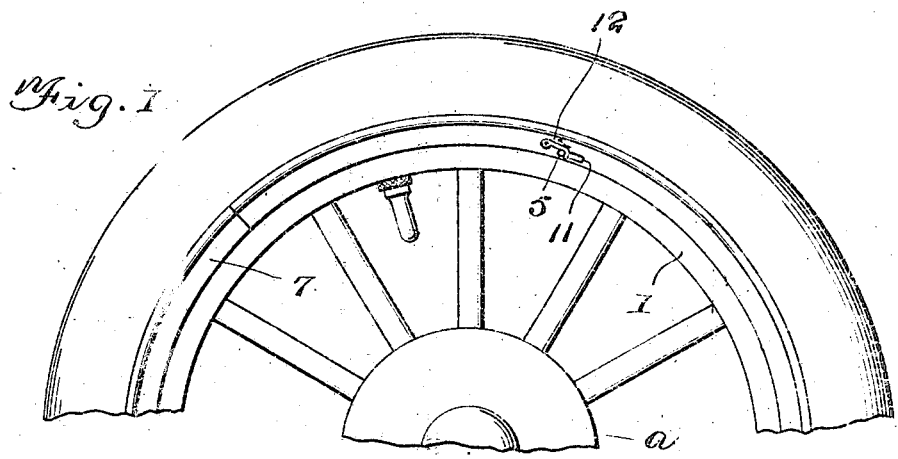
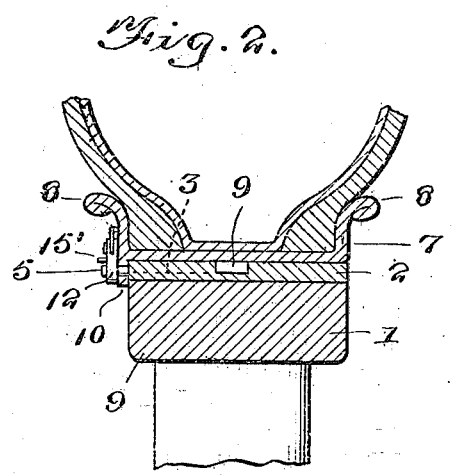
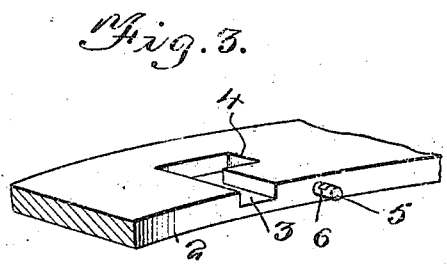
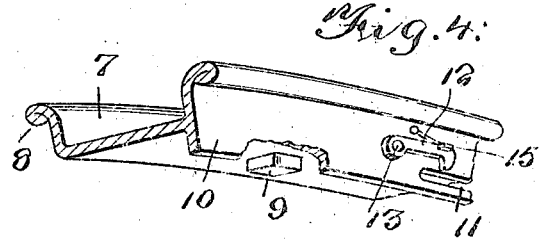
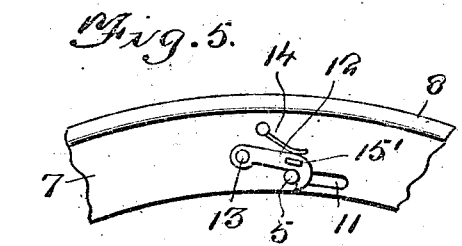
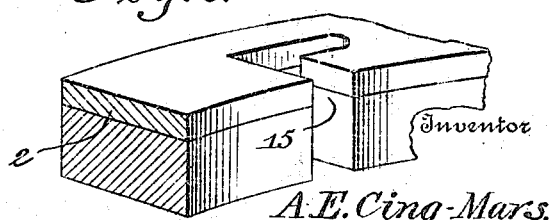
Witnesses
E. R. Ruppert
P. M. Smith
Inventor
A. E. Cinq-Mars.
By Victor J. Evans
Attorney

UNITED STATES PATENT OFFICE.

ARTHUR E. CINQ-MARS, OF SAN FRANCISCO, CALIFORNIA.

DEMOUNTABLE RIM.

1,255,708.  Specification of Letters Patent.  Patented Feb. 5, 1918.

Application filed September 30, 1916. Serial No. 123,172.

*To all whom it may concern:*

Be it known that I, ARTHUR E. CINQ-MARS, a citizen of the United States, residing at San Francisco, in the county of San Francisco and State of California, have invented new and useful Improvements in Demountable Rims, of which the following is a specification.

This invention relates to demountable rims, the broad object of the invention being to construct a demountable rim and fixed rim of a vehicle wheel in such manner that the demountable rim may be easily applied to and removed from the wheel, the demountable and fixed rims having combined therewith novel locking means whereby the demountable rim is prevented from creeping longitudinally of the fixed rim after the demountable rim is in its final or normal position on the wheel.

With the above and other objects in view, the invention consists in the novel construction, combination and arrangement, herein fully described, illustrated and claimed.

In the accompanying drawing:

Figure 1 is a partial side elevation of a vehicle wheel and tire, showing the improved fixed and demountable rims and also the demountable rim locking means.

Fig. 2 is a cross section through the felly and rims on an enlarged scale.

Fig. 3 is a fragmentary perspective view looking toward the outer face of the fixed rim.

Fig. 4 is a fragmentary perspective view of the demountable rim.

Fig. 5 is a fragmentary side elevation showing the locking means for the demountable rim.

Fig. 6 is a fragmentary perspective view of the fixed rim showing the valve tube slot.

Referring to the drawing, *a* designates generally a vehicle wheel having the usual felly 1.

In carrying out the present invention, I fasten a fixed rim 2 around the felly 1 and provide the same in its outer face with a circular series of bayonet grooves or ways 3 each of which opens out at one side of the fixed rim and each of which has the shorter portion 4 thereof extending a short distance longitudinally and about centrally of the fixed rim 2. The fixed rim 2 is also provided at any suitable point with a projecting locking pin 5 which is shown as formed with a notch or groove 6 therein.

The demountable rim 7 is shown as provided with the usual tire retaining flanges 8, one of which may be of the quick detachable type to facilitate the application and removal of a pneumatic or other type of tire. The rim 7 is provided on its inner face with lugs or projections 9 corresponding with the number of bayonet grooves 3 and adapted to enter the same. The rim 2 is further provided at one side with an inwardly extending annular flange 10 formed at one point with a longitudinal slot 11 adapted to receive the pin or projection 5 of the fixed rim 2. When the pin 5 is passed through the slot 11, a locking member or latch 12 is moved into engagement with the pin 5 so as to engage the notch or groove 6 therein, said latch being best illustrated in Fig. 5 where it is shown in the form of a hook which is connected by a pivot 13 to the flange 10 of the demountable rim and held by means of a backing spring 14 in engagement with the pin 5. This prevents the demountable rim from moving longitudinally of the fixed rim and prevents the lugs or projections 9 from moving longitudinally of the portions 4 of the bayonet grooves in the fixed rim. The fixed rim 2 is provided at a suitable point with a bayonet slot 15 corresponding in shape to the bayonet grooves 3, the slot 15 being designed to receive the usual valve neck or tube of a pneumatic tire.

From the foregoing description taken in connection with the accompanying drawing, it will now be understood that in order to place the demountable rim on the fixed rim, the lugs 9 are brought into line with the entrances of the grooves 3. The demountable rim is then pushed laterally upon the fixed rim until the flange 10 abuts against the adjacent edge of the fixed rim then a partial turning movement is given the demountable rim to cause the lugs 9 to enter the longitudinal extensions or portions 4 of the bayonet grooves. During this operation, the pin 5 has passed through the slot 11 and after the final position of the demountable rim has been reached, the latch 12 engages the pin 5 and holds the demountable rim in the last named position. If desired the latch 12 may be provided with a finger grip or projection 15 to facilitate the manipulation thereof when unlatching the demountable rim and removing the latter from the wheel.

I claim:

In a demountable rim structure for vehicle wheels, the combination of a fixed rim having bayonet shaped ways the entrances to which are located at one of the marginal edges of said rim, a fixed locking pin projecting from said marginal edge and having a transverse notch, a demountable rim having lugs on its inner face adapted to enter said ways, a flange extending longitudinally of one of the marginal edges of said demountable rim and formed with a longitudinal slot to receive said locking pin and permit the demountable rim to be turned, a latch attached to the outer side of said flange and movable into and out of engagement with the notch of said locking pin, and a spring serving to press said latch into engagement with said notch in the pin.

In testimony whereof I affix my signature.

ARTHUR E. CINQ-MARS.